United States Patent
Salmela et al.

(10) Patent No.: US 10,693,879 B2
(45) Date of Patent: Jun. 23, 2020

(54) METHODS, DEVICES AND MANAGEMENT TERMINALS FOR ESTABLISHING A SECURE SESSION WITH A SERVICE

(71) Applicant: Telefonaktiebolaget LM Ericsson (publ), Stockholm (SE)

(72) Inventors: Patrik Salmela, Espoo (FI); Jaime Jiménez, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 183 days.

(21) Appl. No.: 15/504,578

(22) PCT Filed: Aug. 20, 2014

(86) PCT No.: PCT/SE2014/050949
§ 371 (c)(1),
(2) Date: Feb. 16, 2017

(87) PCT Pub. No.: WO2016/028198
PCT Pub. Date: Feb. 25, 2016

(65) Prior Publication Data
US 2017/0237742 A1    Aug. 17, 2017

(51) Int. Cl.
*G06F 7/04* (2006.01)
*G06F 15/16* (2006.01)
(Continued)

(52) U.S. Cl.
CPC ............ *H04L 63/101* (2013.01); *H04L 9/32* (2013.01); *H04L 9/3263* (2013.01); *H04L 29/08* (2013.01);
(Continued)

(58) Field of Classification Search
CPC . H04L 63/101; H04L 63/0807; H04L 67/141; H04L 63/0823; H04L 63/166;
(Continued)

(56) References Cited

U.S. PATENT DOCUMENTS 5,881,239 A * 3/1999 Desgrousilliers ....... H04L 29/06
709/226
6,094,485 A * 7/2000 Weinstein ............. H04L 63/105
380/30
(Continued)

FOREIGN PATENT DOCUMENTS

EP   2741465 A1   6/2014
WO   03079634 A1   9/2003
(Continued)

OTHER PUBLICATIONS

Extended European Search Report dated Jul. 5, 2017, issued in European Patent Application No. 14899928.7, 8 pages.
(Continued)

*Primary Examiner* — Trong H Nguyen
*Assistant Examiner* — Amie C. Lin
(74) *Attorney, Agent, or Firm* — Rothwell, Figg, Ernst & Manbeck, P.C.

(57) ABSTRACT

This disclosure provides a method, performed in a resource-constrained device 60, for establishing a secure session with a service 800 delivered by a server terminal 80 using a security protocol over a communication network. The resource-constrained device 60 is registered at a management terminal 70. The method comprises receiving, from the server terminal 80, a credential associated with the service 800. The method comprises sending, to the management terminal 70, a service approval request 803. The service approval request 803 comprises an identifier of the service 800 and/or the credential. The method comprises receiving, from the management terminal 70, a response 804. The response 804 comprises an indication that the service 800 is approved, and a security context for a resumption of the secure session. The secure session has been established by the management terminal 70. The method comprises initi-
(Continued)

ating the resumption of the secure session with the service 800 using the security context.

32 Claims, 10 Drawing Sheets

(51) Int. Cl.
    *G06F 17/30*     (2006.01)
    *H04L 29/06*     (2006.01)
    *H04W 4/70*     (2018.01)
    *H04L 29/08*     (2006.01)
    *H04L 9/32*     (2006.01)
    *H04W 12/08*     (2009.01)

(52) U.S. Cl.
    CPC ...... *H04L 63/0807* (2013.01); *H04L 63/0823* (2013.01); *H04L 63/166* (2013.01); *H04L 67/04* (2013.01); *H04L 67/141* (2013.01); *H04L 67/145* (2013.01); *H04W 4/70* (2018.02); *H04W 12/08* (2013.01); *H04L 2209/68* (2013.01)

(58) Field of Classification Search
    CPC ..... H04L 67/04; H04L 67/145; H04L 9/3263; H04L 29/08; H04L 9/32; H04L 2209/68; H04L 9/083; H04L 63/062; H04L 29/06721; H04L 29/08639; H04L 67/148; H04L 9/321; H04W 4/70; H04W 12/08; H04N 21/26613
    See application file for complete search history.

(56) References Cited

U.S. PATENT DOCUMENTS

| | | | |
|---|---|---|---|
| 6,324,648 B1* | 11/2001 | Grantges, Jr. | H04L 63/02 709/229 |
| 7,683,773 B1 | 3/2010 | Goodall et al. | |
| 9,124,629 B1* | 9/2015 | Bowen | H04L 63/168 |
| 2003/0177348 A1 | 9/2003 | Davies et al. | |
| 2004/0260821 A1* | 12/2004 | Yamamoto | H04L 61/3035 709/229 |
| 2006/0190402 A1* | 8/2006 | Patron | G06Q 10/06 705/51 |
| 2009/0064298 A1* | 3/2009 | Yamamoto | H04L 61/3035 726/6 |
| 2012/0023241 A1* | 1/2012 | Goel | H04L 63/0428 709/228 |
| 2012/0284506 A1* | 11/2012 | Kravitz | G06Q 40/00 713/151 |
| 2013/0067552 A1* | 3/2013 | Hawkes | H04L 63/166 726/7 |
| 2013/0198509 A1* | 8/2013 | Buruganahalli | H04L 67/146 713/151 |
| 2013/0205360 A1 | 8/2013 | Novak et al. | |
| 2014/0165147 A1* | 6/2014 | Hershberg | H04L 63/083 726/4 |
| 2014/0215206 A1* | 7/2014 | Courtney | H04L 9/3268 713/156 |
| 2015/0172064 A1* | 6/2015 | Takenaka | H04L 9/3268 713/156 |
| 2015/0288679 A1* | 10/2015 | Ben-Nun | H04L 67/141 726/10 |

FOREIGN PATENT DOCUMENTS

| | | |
|---|---|---|
| WO | 2012035340 A1 | 3/2012 |
| WO | 2012/068094 A1 | 5/2012 |
| WO | 2012068094 A1 | 5/2012 |

OTHER PUBLICATIONS

International Search Report and Written Opinion dated May 20, 2015 in International application No. PCT/SE2014/050949, 13 pages.
European Communication dated Feb. 19, 2019, issued in European Patent Application No. 14 899 928.7, 4 pages.
Indian Office Action dated Jun. 10, 2019 issued in Indian Application No. 201717003058. (6 pages).

* cited by examiner

METHODS, DEVICES AND MANAGEMENT TERMINALS FOR ESTABLISHING A SECURE SESSION WITH A SERVICE

CROSS-REFERENCE TO RELATED APPLICATION(S)

This application is a 35 U.S.C. § 371 National Phase Entry Application from PCT/SE2014/050949, filed Aug. 20, 2014, and designating the United States.

TECHNICAL FIELD

The present disclosure pertains to the field of secure session establishment in the Internet-of-Things. More specifically, the disclosure relates to methods, devices and management terminals for establishing a secure session with a service using a security protocol over a communication network.

BACKGROUND

The Internet of Things, IoT, relates to the interconnection of resource-constrained devices over a public network infrastructure, such as the Internet. A resource-constrained device utilizes services in the public network, which the resource-constrained device needs to authenticate. However, a resource-constrained device is limited in terms of processing power, and battery etc. Therefore, it is necessary in the IoT area to focus on optimizing the use of resources by the resource-constrained device to perform various functions including authentication, in order to achieve a maximal lifetime of the resource-constrained device.

Due to the limited capabilities of the resource-constrained device, it may be hard to provide an authentication solution that is both sufficiently secure and sufficiently lightweight. Standardized protocols to perform certificate-based authentication and secure session establishment are often computationally intensive, which may drain the resources of the resource-constrained device.

The following prior-arts attempt to address the problem of certificate verification in a constrained environment.

An International patent application published as WO2012/068094 discloses a constrained network entity that may determine, via an authentication procedure with a core network entity, the trustworthiness of an endpoint attempting to establish a secure channel with the constrained network entity. The constrained network entity may receive a certificate from the endpoint attempting to establish the secure channel and the constrained network entity may send the certificate asserted by the endpoint to a core network entity for validation. The core network entity may indicate to the constrained network entity the validity of the certificate. The constrained network entity may determine whether to establish the secure channel with the endpoint based on the validity of the certificate.

A US patent application published as US2007/0245414 discloses embodiments of proxy authentication and indirect certificate chaining. In an implementation, authentication for a client occurs via a proxy service. Proxy service communicates between client and server, and caches security tokens on behalf of the client.

A US patent application published as US2009/0126001 discloses techniques to manage security certificates. An apparatus may comprise a certificate proxy server having a transceiver and a certificate manager module. The certificate manager module may be operative to register a digital identity certificate for a call terminal to perform authentication operations on behalf of the call terminal, and manage the digital identity certificate for the call terminal.

However, it is not sufficient to provide address the problem of certificate verification in a constrained environment. An outstanding problem, given the prior-arts, remains for the session establishment to be lightweight and secure so as to be efficiently supported by the resource-constrained device.

SUMMARY

An object of the present disclosure is to provide methods, resource-constrained devices and management terminals for establishing a secure session with a service which seeks to mitigate, alleviate, or eliminate one or more of the above-identified deficiencies in the art and disadvantages singly or in any combination and to provide improved methods for establishing a secure session between a resource-constrained device and a service, so as to achieve a lightweight secure session establishment.

This object is obtained by a method, performed in a resource-constrained device, for establishing a secure session with a service delivered by a server terminal using a security protocol over a communication network. The resource-constrained device is registered at a management terminal. The method comprises receiving, from the server terminal, a credential associated with the service. The method comprises sending, to the management terminal, a service approval request. The service approval request comprises an identifier of the service and/or the credential. The method comprises receiving, from the management terminal, a response. The response comprises an indication that the service is approved, and a security context for a resumption of the secure session. The secure session has been established by the management terminal. The method comprises initiating the resumption of the secure session with the service using the security context.

It is an advantage of this disclosure that the resource-constrained device is enabled to perform a fast and lightweight session establishment with the service, without having to perform any computationally intensive operations, even when the service is not yet approved by the management terminal. The resource-constrained device advantageously initiates a resumption of the secure session initially established by the management terminal. This disclosure allows reducing the computational overhead for the secure session establishment and thereby enhances the battery life of the resource-constrained device. This disclosure provides to the resource-constrained device robustness against resource-exhaustion attacks.

According to one aspect of this disclosure, the method performed in a resource-constrained device comprises determining whether the identifier of the service is comprised in a whitelist of approved services; and sending to the management terminal the service approval request when it is determined that the identifier of the service is not comprised in the whitelist.

This disclosure relates to a method, performed in a resource-constrained device, for establishing a secure session with a service delivered by a server terminal using a security protocol over a communication network. The resource-constrained device is registered at a management terminal. The method comprises obtaining a whitelist of approved services, and determining whether an identifier of the service is comprised in the whitelist of approved services. The method comprises determining based on the whitelist whether the service supports session resumption when it is determined that the identifier of the service is comprised in the whitelist. The method further comprises the following when it is determined that the service supports session resumption: requesting a security context of the secure session from the management terminal; receiving, from the management terminal, the security context of the secure session; and initiating a resumption of the secure session with the service using the security context.

It is an advantage of this disclosure that the resource-constrained is capable of efficiently determining if the service is already approved using the whitelist of approved service, and can thereby skip the service approval based on the credential for an already approved service.

This disclosure relates to a method, performed in a management terminal, for supporting an establishment of a secure session between a resource-constrained device and a service. The resource-constrained device is registered at the management terminal. The method comprises receiving, from the resource-constrained device, a service approval request comprising an identifier of the service and/or a credential associated with the service. The method comprises verifying the credential in order to approve the service; and establishing the secure session between the management terminal and the service using the verified credential. The method comprises storing a security context of the secure session; and sending to the resource-constrained device a response. The response comprises an indication that the service is approved and comprises the security context for enabling a resumption of the secure session between the resource-constrained device and the service.

It is an advantage of this disclosure that the management terminal supports the resource-constrained device by performing computationally intensive operations involved in the secure session establishment. This disclosure advantageously allows the management terminal to transfer a security context of the secure session to the resource constrained device so that the resource-constrained device is enabled to initiate the resumption of the secure session.

According to some aspects of this disclosure, the security context of the secure session comprises a session identifier of the secure session, a session ticket of the secure session, and/or session information including a master key and/or parameters necessary for resumption.

According to some aspects of this disclosure, the method performed in the management terminal comprises terminating the secure session between the management terminal and the service.

In one or more embodiments of the method performed by the management terminal, the step of establishing the secure session comprises obtaining, from the service, the session identifier of the secure session.

In one or more embodiments of the method performed by the management terminal, the step of establishing the secure session comprises indicating to the service a support for stateless session resumption feature of the security protocol; and obtaining the session ticket of the secure session from the service.

According to some aspects of this disclosure, the method performed in the management terminal comprises sending the whitelist of approved services to the resource-constrained device.

In one or more embodiments, the whitelist of approved services comprises for each service: the identifier of the service, an approval status of the service, the credential associated with the service, the indication of support for the stateful session resumption feature of the service, and/or the indication of support for the stateless session resumption feature of the service.

In one or more embodiments, the credential comprises a certificate associated with the service, a fingerprint of the certificate and/or a public key associated with the service.

In one or more embodiments, the identifier of the service comprises a uniform resource identifier of the service.

According to some aspects of this disclosure, the security protocol comprises a public key-based security protocol and wherein the public key-based security protocol comprises a transport layer security (TLS) protocol, a secure sockets layer (SSL) protocol, a datagram transport layer security (DTLS) protocol, and/or a secure shell (SSH) protocol.

This disclosure relates to a resource-constrained device for establishing a secure session with a service delivered by a server terminal using a security protocol over a communication network. The resource-constrained device is registered with a management terminal. The resource-constrained device comprises processing means adapted to receive, from the server terminal, a credential associated with the service; and send to the management terminal a service approval request. The service approval request comprises an identifier of the service and/or the credential. The processing means is adapted to receive from the management terminal a response. The response comprises an indication that the service is approved, and a security context for a resumption of the secure session. The secure session has been established by the management terminal. The processing means is adapted to initiate the resumption of the secure session with the service using the security context. The processing means of the resource-constrained device may comprise a processor and a memory wherein the memory is containing instructions executable by the processor. A resource-constrained device according to this disclosure provides a lightweight session establishment of the secure session by advantageously resuming the secure session established at the management terminal.

According to one aspect of this disclosure, the processing means of the resource-constrained device is adapted to determine whether the identifier of the service is comprised in a whitelist of approved services.

This disclosure relates to a resource-constrained device for establishing a secure session with a service delivered by a server terminal using a security protocol over a communication network. The resource-constrained device is registered with a management terminal. The resource-constrained device comprises processing means adapted to obtain a whitelist of approved services; and determine whether an identifier of the service is comprised in the whitelist of approved services. When it is determined that the identifier of the service is comprised in the whitelist, the processing means is adapted to determine based on the whitelist whether the service supports session resumption. When it is determined that the service supports session resumption, the processing means is adapted to request a security context of the secure session from the management terminal; receive, from the management terminal, the security context of the secure session; and initiate a resumption of the secure session with the service using the security context. The processing means of the resource-constrained device may comprise a processor and a memory wherein the memory is containing instructions executable by the processor.

This disclosure relates to a management terminal for supporting an establishment of a secure session between a resource-constrained device and a service, the resource-constrained device being registered at the management terminal, the management terminal comprising processing means adapted to receive a service approval request from the resource-constrained device. The service approval request comprises an identifier of the service and/or a credential associated with the service. The processing means is adapted to verify the credential in order to approve the service, establish a secure session between the management terminal and the service using the verified credential; and store a security context of the secure session. The processing means is adapted to send to the resource-constrained device a response, the response comprising an indication that the service is approved, and the security context for enabling a resumption of the secure session between the resource-constrained device and the service. The processing means of the management terminal may comprise a processor and a memory wherein the memory is containing instructions executable by the processor.

According to one aspect of this disclosure, the processing means of the management terminal is adapted to obtain from the service a session identifier of the secure session.

According to another aspect of this disclosure, the processing means of the management terminal is adapted to indicate to the service a support for stateless session resumption feature of the security protocol; and to obtain the session ticket of the secure session from the service.

This disclosure relates to a computer program, comprising computer readable code which, when run on a processing means of a resource-constrained device, causes the resource-constrained device to perform any step of the methods as disclosed herein.

This disclosure relates to a computer program, comprising computer readable code which, when run on a processing means of a management terminal, causes the management terminal to perform any of the steps of the methods as disclosed herein.

Advantages presented for the methods performed in any of devices, and terminals are applicable to the devices, the terminals and the computer programs.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
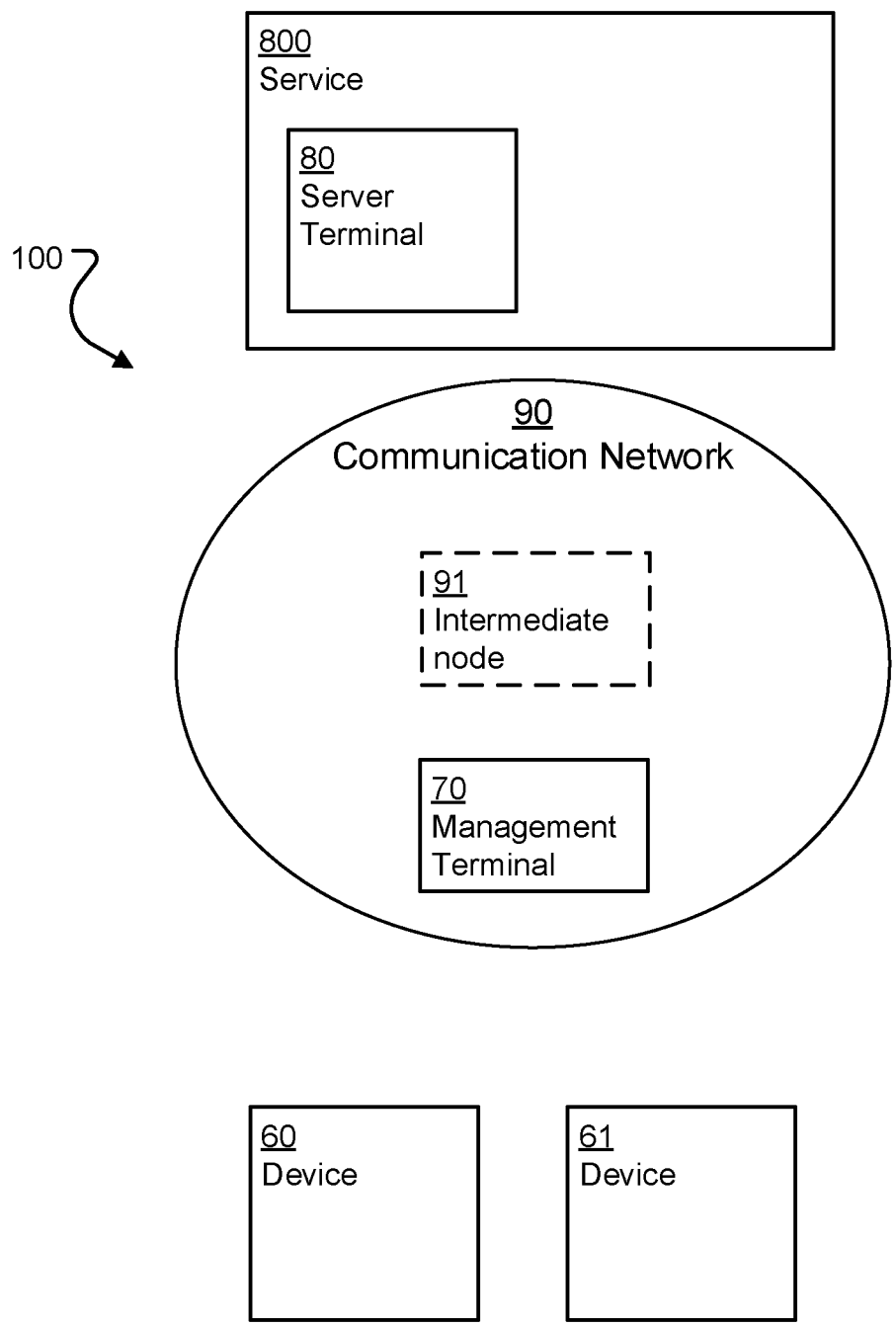
FIG. 1 is a system diagram illustrating an exemplary communication network, an exemplary resource-constrained device, an exemplary management terminal and an exemplary service according to this disclosure.

Aspects of the present disclosure will be described more fully hereinafter with reference to the accompanying drawings. The resource-constrained devices, management terminals and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards establishing a secure session between a resource-constrained device and a service with the support from a management terminal. As part of the development of the example embodiments presented herein, a problem will first be identified and discussed.

The general object of embodiments of the present disclosure is to address at least one or some of the disadvantages with the prior art solutions described above. The various steps described below in connection with the figures should be primarily understood in a logical sense, while each step may involve the communication of one or more specific messages depending on the implementation and protocols used.

The general idea is to reduce the computational burden at a resource-constrained device when establishing a secure session with a service without comprising the security of the session. This disclosure proposes to offload or to outsource the initial establishment of the secure session with the service to a management terminal. The resource-constrained device receives then from the management terminal a security context that enables the resource-constrained device to resume the secure session with the service, thereby overcoming the drawbacks mentioned earlier.

As used herein, the term "session" refers to an information exchange between two or more communicating entities, such as a message exchange. A session is set up or established at a certain point in time and may be terminated at a later point in time. A session is e.g. an application layer session, a session layer session (e.g. a Session Initiation Protocol, SIP, session, a phone call, a video call, and/or a multimedia call), a transport layer session (e.g. a TCP session). A session is identified by a session identifier. A session identifier is a piece of data that is used in communications with another terminal to identify a session. A session identifier may be a unique identifier and/or a uniquely derived identifier. A session is secure if the session is established using a security protocol to e.g. authenticate the end-parties, to protect the confidentiality and the integrity of the messages exchanged in the session, and/or to protect against replay-attacks. A secure session is established using a security protocol such as TLS, SSL, SSH or DTLS.

In this disclosure, the term "resource-constrained device" used herein refers to a device that has limited communication capabilities, limited memory, limited computational capabilities, and/or limited battery life. A resource-constrained device is for example an IoT device, and/or a sensor such as a low power sensor. A resource-constrained device may be a device comprising a universal integrated circuit card configured to communicate. A resource-constrained device may be a mobile resource-constrained device, or a fixed resource-constrained device. Examples of resource-constrained devices include monitoring implants, biochip transponders, smart thermostat, smart metering devices, and smart appliances. A resource-constrained device has for example such limited resources that the resource-constrained device is unable to independently perform some tasks required to establish a secure session. A resource-constrained device has for example such limited resources that performing some tasks required to establish a secure session would drain all its resources and would result in the device being non-operational.

A resource-constrained device is registered at a management terminal. The management terminal refers to a terminal configured to manage, control and/or support the resource-constrained device. There is a trust relationship between the management terminal and the resource-constrained device. The owner or user of the resource-constrained device is able through the management terminal (e.g. a management portal provided on e.g. a home computer) to manage and to send commands (e.g. update firmware, change configuration, etc.) to the resource-constrained device. The management terminal has more resources, such as communication capabilities, power, memory and a computational capability, than the resource-constrained device. The management terminal is configured to communicate with the resource-constrained device via a wireless communication interface, and/or a wired communication interface. The management terminal is e.g. configured to have ability for Internet/intranet access, web browser, organizer, calendar, a camera (e.g., video and/or still image camera), a sound recorder (e.g., a microphone), and/or global positioning system, GPS, receiver; a personal communications system (PCS) user equipment that may combine a cellular radiotelephone with data processing; a tablet; a personal digital assistant, PDA that can include a radiotelephone or wireless communication system; a laptop; a camera (e.g., video and/or still image camera) having communication ability; and/or any other computation or communication device capable of transceiving, such as a personal computer, a home entertainment system, a television, etc.

FIG. 1 shows a system diagram 100 illustrating an exemplary communication network 90, an exemplary resource-constrained device 60, 61, an exemplary management terminal 70 and an exemplary service 800 according to this disclosure. The service 800 is delivered by a server terminal 80. The service 800 may comprise one or more server terminals 80. The term "server terminal" is used to refer to a terminal configured to act as a server terminal, such as a TLS server terminal. The clientserver characteristic describes the relationship of cooperating programs in an application. A server terminal provides a function or service to one or more client terminals, which initiate requests for such services. A client terminal, such as the resource-constrained device 60, 61 or the management terminal 70, and a server terminal, e.g. server terminal 80, exchange messages in a request-response messaging pattern: the client terminal sends e.g. a request, and the server terminal returns e.g. a response. A client terminal and a server terminal may both be a user equipment. For example, a client terminal and a server terminal are peers in a peer-to-peer system. Alternatively, a client terminal is a user equipment while a server terminal is a network node. The resource-constrained device 60, 61 and the management terminal 70 are for example devices or terminals configured to act as a client terminals of the security protocol, such as TLS client terminals.

The communication network 90 may comprise the management terminal 70. The communication network is e.g. a home area network. The communication network 90 comprises a wired communication network, and/or a wireless communication network. A wired communication network comprises e.g. an Internet protocol-based communication network, a fiber-optic communication network, a telephone network, a cable network. A wireless communication network comprises e.g. a short range communication network, wireless local area network, WLAN, a cellular network such as 3GPP Long term evolution, LTE, system, and a wideband code division multiple access, WCDMA system.

Figure 2:
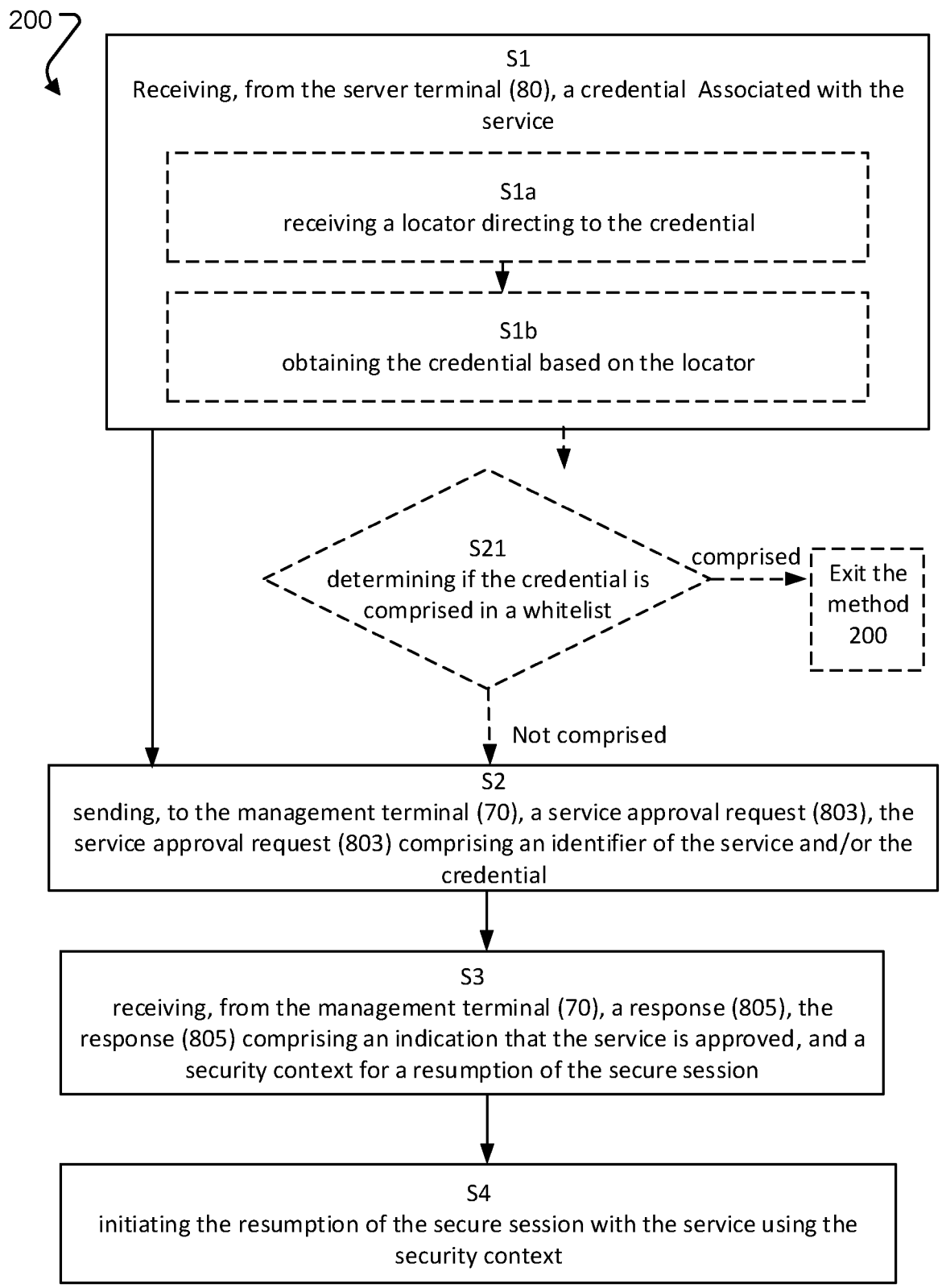
FIG. 2 is a flow chart illustrating an exemplary method, performed in a resource-constrained device, for establishing a secure session according to this disclosure.

FIG. 2 shows a flow chart illustrating an exemplary method 200, performed in a resource-constrained device 60, for establishing a secure session with a service 800 according to this disclosure. The method 200 is for establishing a secure session with a service 800 delivered by a server terminal 80 using a security protocol over a communication network 90. The resource-constrained device 60 is registered at a management terminal 70. The method 100 comprises receiving at step S1, from the server terminal 80, a credential associated with the service. As used herein, the term "credential" refers to a cryptographic material that contributes to establishing an identity of a party to a session. A credential comprises a certificate associated with the service, a fingerprint of the certificate and/or a public key associated with the service. A credential comprises a security credential. A credential is self-issued or issued by a trusted third party. A certificate comprises e.g. a public key, information about its owner's identity, and/or the digital signature of an entity that has verified the certificate's contents are correct. A certificate is identified with a certificate fingerprint. The certificate fingerprint is e.g. a secure one-way hash of the DER, distinguished encoding rules, form of the certificate. A certificate fingerprint is for example X.509 certificate fingerprint. The security protocol comprises a public key-based security protocol and wherein the public key-based security protocol comprises a transport layer security (TLS) protocol, a secure sockets layer (SSL) protocol, a datagram transport layer security (DTLS) protocol, and/or a secure shell (SSH) protocol. For example, in a TLS session, parties to the session indicate their identities by presenting authentication certificates (e.g. X.509 certificates) as part of the TLS handshake procedure.

In one or more embodiments, the step of receiving S1 the credential comprises receiving S1a, from e.g. the server terminal 89, a locator directing to the credential and obtaining S1b the credential based on the locator. Obtaining S1b the credential based on the locator comprises retrieving the credential from a data storage identified by the locator. The locator is for example a pointer to the credential.

Figure 8:
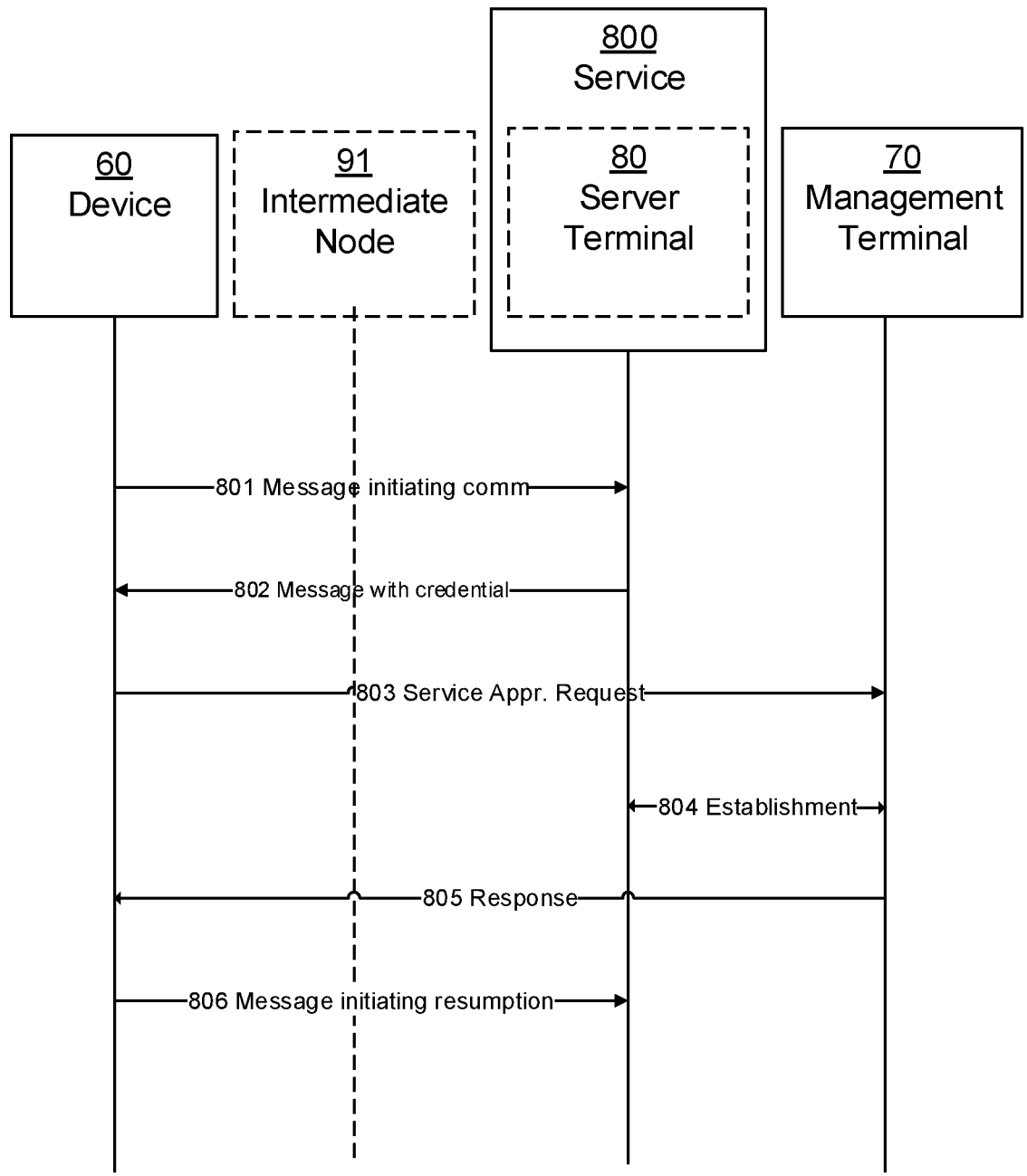
FIG. 8 is a signaling diagram illustrating an exemplary exchange of messages for establishing a secure session according to this disclosure.

In a next step S2, the resource-constrained device 60 sends, to the management terminal 70, a service approval request, such as service approval request 803 illustrated in FIG. 8. The service approval request 803 comprises an identifier of the service and/or the credential. The identifier of the service may be a uniform resource identifier, URI, of the service such as uniform resource locator, URL, of the service.

In step S3, the resource-constrained device 60 receives, from the management terminal 70, a response 805. The response 805 comprises an indication that the service is approved, and a security context for a resumption of the secure session. The secure session has been established by the management terminal 70. The security context comprises a session identifier of the secure session, a session ticket of the secure session, and/or session information including a master key and/or parameters necessary for resumption. A session identifier is a piece of data that is used in communication with another entity such as the service 800 or the server terminal 80 to identify a session. A session identifier is a unique identifier and/or a uniquely derived identifier. The term "session ticket" refers to a cryptographically protected data structure that is created and consumed by the server terminal to rebuild session-specific state when resuming a session with a client device, such as the resource constrained device. A session ticket contains the session information in encrypted form and is used to resume session. With the session ticket, the server terminal is not required to keep session state stored. Parameters necessary for resumption are for example cipher suite and compression method. The response 805 or the security context needs to be confidentiality protected to protect against eavesdropping attacks.

In step S4, the resource-constrained device 60 initiates the resumption of the secure session with the service using the security context. The step S4 of initiating the resumption of the secure session with the service using the security context comprises initiating with the service 800, e.g. with the server terminal 80, an abbreviated establishment procedure of the security protocol, such as an abbreviated handshake of the TLS protocol, using the security context, such as the session identifier, the session ticket, the master key and/or other parameters.

According to some aspects of this disclosure, the method 200 comprises determining S21 whether the identifier of the service is comprised in a whitelist of approved services; and sending S2 to the management terminal 70 the service approval request 803 when it is determined that the identifier of the service is not comprised in the whitelist. When it is determined that the identifier of the service is comprised in the whitelist, the resource-constrained device 60 exits the method 200. The step of determining S21 may comprise obtaining a whitelist of approved service maintained by the management terminal 70. The whitelist of approved services comprises for each service: the identifier of the service, an approval status of the service, the credential associated with the service, the indication of support for the stateful session resumption feature of the service, and/or the indication of support for the stateless session resumption feature of the service.

In an illustrative example where the disclosed technique is applied, the resource-constrained device 60 initiates a connection to the service 800 and receives a response indicating that the service 800 wants to use (at least server side) certificate based security and provides the certificate to the resource-constrained device 60. The resource-constrained device 60 can first check if this certificate has already been approved by the management terminal 70, i.e. if the certificate and/or service 800 are whitelisted. This can be done using a whitelist stored locally at the resource-constrained device 60 and/or from a whitelist maintained by the management terminal 70, e.g. in the network. If the service 800 and/or the certificate does not appear approved in the local whitelist, the resource-constrained device 60 connects to the management terminal 70 and provides the certificate and/or service identifier (e.g. URL). If the resource-constrained device 60 provides the management terminal 70 the service identifier, the management terminal 70 retrieves the certificate associated with the service 800 and this saves bandwidth/transmission power at the resource-constrained device 60. The communication between the management terminal 70 and the resource-constrained device 60 is to be at least integrity protected and optionally confidentiality protected, so a man in the middle cannot modify the information to perform an attack. The management terminal 70 verifies the certificate, including checking the signer of the certificate. This step includes possibly manual steps by an administrator, basically making a decision based on the facts, in case the certificate and/or signer of the certificate are unknown to the management terminal 70. When the management terminal 70 determines that the certificate is verified, e.g. valid, for the service 800, the management terminal 70 establishes a secure session, such as a TLS session with the service 800. Establishing the secure session to the service 800 or server terminal 80 is performed to verify that the service 800 or the server terminal 80 does possess the corresponding private key and is indeed entitled to use the certificate. After successfully establishing a secure connection using the certificate, the management terminal 70 terminates the secure session. The management terminal 70 lists the service 800 as an approved service in a whitelist of approved services. The management terminal 70 records all services and/or certificates to which the resource-constrained devices under its management are trying to connect to and the status of these services (e.g. approved, denied) and possibly features of these services (e.g. supports session resumption, supports stateful session resumption, supports stateless session resumption etc.). For example, the management terminal 70 distributes the whitelist to its resource-constrained devices, e.g. at some interval. The management terminal 70 can alternatively or additionally maintain a lookup table that can be used by the resource-constrained devices when they need to connect to a service using certificates. This reduces the operations needed to be performed by the management terminal 70. The management terminal 70 needs to check the status/features of a service 800 once instead of every time a resource-constrained device 60 wants to connect to the service 800. Furthermore, the management terminal 70 stores the security context including master key of the session, the session identifier or the session ticket, and session related parameters that are needed to resume the session (cipher_suite, compression_method etc. as defined in RFC 5246). The management terminal 70 informs the resource-constrained device 60 that the service is approved, provides the security context for resumption and possibly an updated whitelist of approved services. The response 805 sent to the resource-constrained device 60 should be integrity and/or confidentiality protected to protect against man in the middle attacks. The resource-constrained device 60 then resumes the secure session using the security context, including the session identifier, or the session ticket, and other parameters. The next time the resource-constrained device 60 initiates a connection to the same service 800, the resource-constrained device 60 is able to skip connecting to the management terminal 70 and is able to directly resume the secure session to the service using the security context, e.g. using TLS session identifier/ticket. Furthermore, any other resource-constrained device managed by the management terminal 70 using the whitelist is able to determine upon first connection to the service whether the service is approved, and supports session resumption. The resource-constrained device can then request the management terminal 70 to initiate a secure session with the service and to transfer the security context of the secure session for resumption.

Figure 3:
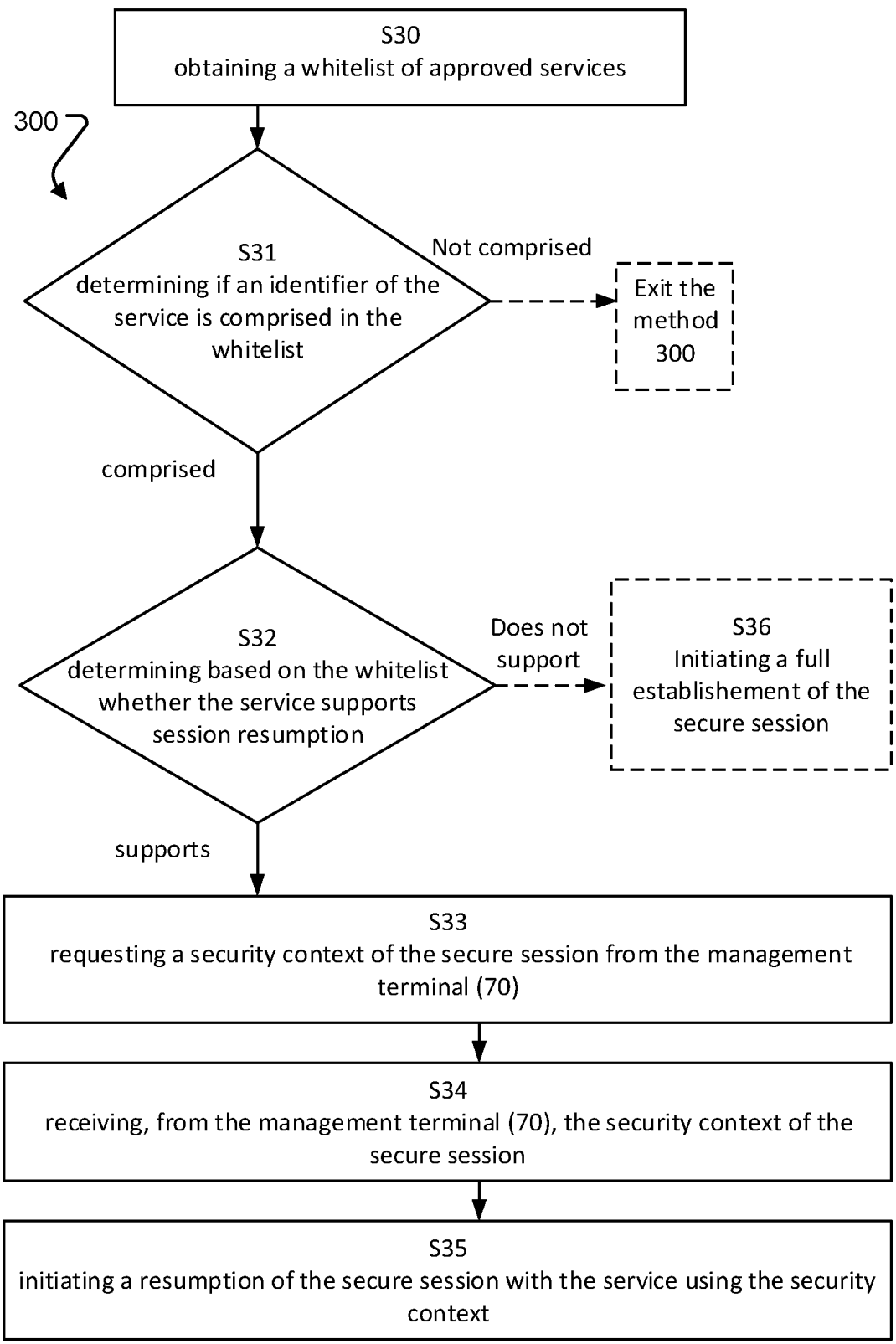
FIG. 3 is a flow chart illustrating an exemplary method, performed in a resource-constrained device, for establishing a secure session according to this disclosure.

FIG. 3 shows a flow chart illustrating an exemplary method 300, performed in a resource-constrained device 61, for establishing a secure session according to this disclosure. The method 300 enables establishing a secure session with a service 800 delivered by a server terminal 80 using a security protocol over a communication network 90. The resource-constrained device 61 is registered at a management terminal 70. The method 300 comprises obtaining S30 a whitelist of approved services. The step of obtaining S30 a whitelist of approved services comprises receiving the whitelist from the management terminal, and/or retrieving the whitelist from a remote network location.

In the next step S31, the resource-constrained device 61 determines whether an identifier of the service is comprised in the whitelist of approved services. The identifier of the service is for example the URI. The whitelist of approved services comprises for each service: the identifier of the service, an approval status of the service, the credential associated with the service, the indication of support for the stateful session resumption feature of the service, and/or the indication of support for the stateless session resumption feature of the service.

When it is determined that the identifier of the service is comprised in the whitelist, then the resource-constrained device 61 in step S32 determines based on the whitelist whether the service supports session resumption. When it is determined that the identifier of the service is not comprised in the whitelist, the resource-constrained device 61 exits the method 300.

When it is determined that the service supports session resumption, then the resource-constrained device 61 requests in step S33 a security context of the secure session from the management terminal 70. The secure session has been established and possibly terminated by the management terminal 70, which resulted in the management terminal 70 holding the security context that enables resumption of the secure session at the resource-constrained device 61. The security context comprises a session identifier of the secure session, a session ticket of the secure session, and/or session information including a master key and/or parameters necessary for resumption.

When it is determined that the approved service 800 does not supports session resumption, the resource-constrained device 61 can continue by initiating S36 a full establishment procedure (e.g. a full TLS handshake) to the service 800 (e.g. to server terminal 80).

In step S34, the resource-constrained device 61 receives, from the management terminal, the security context of the secure session. The transmission of the security context needs to be confidentiality protected to protect against eavesdropping attacks.

In step S35, the resource-constrained device 61 initiates a resumption of the secure session with the service using the security context. The step S35 of initiating the resumption of the secure session with the service using the security context comprises initiating with the service 800, e.g. with the server terminal 80, an abbreviated establishment procedure of the security protocol, such as an abbreviated handshake of the TLS protocol. The abbreviated establishment procedure of the security protocol is performed using the security context including session identifier, and/or session ticket, depending on whether the service supports stateful and/or stateless session resumption.

Figure 4:
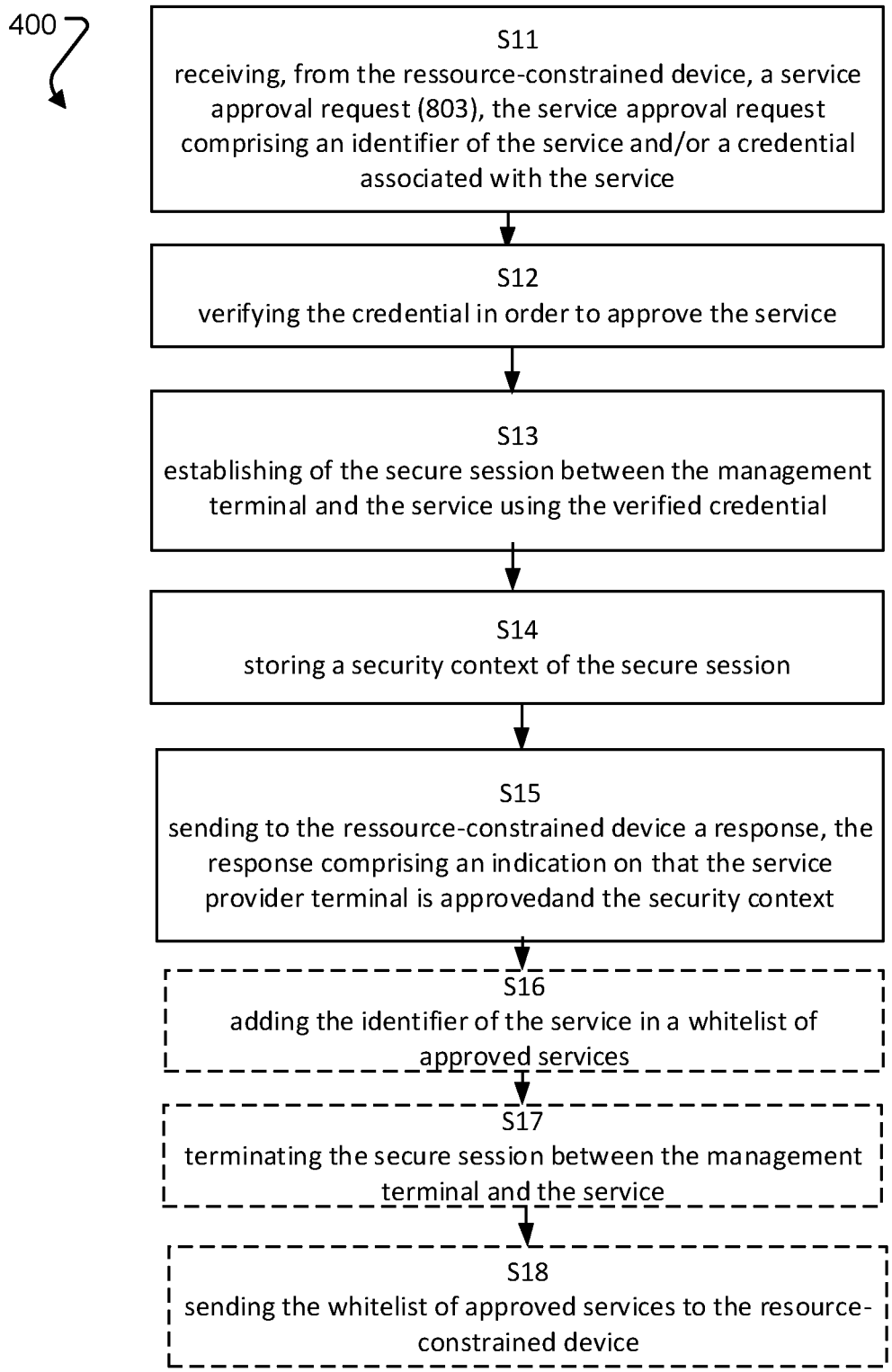
FIG. 4 is a flow chart illustrating an exemplary method, performed in a management terminal, for supporting an establishment of a secure session between a resource-constrained device and a service, according to this disclosure.

FIG. 4 shows a flow chart illustrating an exemplary method 400, performed in a management terminal 70, for supporting an establishment of a secure session between a resource-constrained device 60 and a service 800, according to this disclosure. The method 400 is for supporting an establishment of a secure session between a resource-constrained device 60, 61 and a service 800. The resource-constrained device 60 is registered at the management terminal 70. The method 400 comprises receiving S11, from the resource-constrained device 60 a service approval request 803. The service approval request 803 comprises an identifier of the service and/or a credential associated with the service.

In the next step S12, the management terminal 70 verifies the credential in order to approve the service.

In step S13, the management terminal 70 establishes the secure session with the service 800 using the verified credential. The management terminal 70 establishes the secure session with the service 800, with e.g. the server terminal 80, using the verified credential to prove that the service 800 or the server terminal 80 does possess the corresponding private key and is indeed entitled to use the credential.

In step S14, the management terminal 70 stores a security context of the secure session. The management terminal 70 obtains during the session establishment the security context of the secure session as well as information about features supported by the service (e.g. supports session resumption, supports stateful session resumption, supports stateless session resumption etc.).

In step S15, the management terminal 70 sends to the resource-constrained device 60 a response 805. The response 805 comprises an indication that the service is approved and the security context for enabling a resumption of the secure session between the resource-constrained device 60 and the service 800.

In one or more embodiments, the management terminal 70 adds S16 the identifier of the service 800 in a whitelist of approved services. The whitelist of approved services comprises e.g. for each service: the identifier of the service, an approval status of the service, the credential associated with the service, the indication of support for the stateful session resumption feature of the service, and/or the indication of support for the stateless session resumption feature of the service. For example, the management terminal 70 adds S16 the identifier of the service 800 to the whitelist when the credential is verified and/or the secure session to the service is successfully established. The management terminal 70 may store the credential of the service 800 in the whitelist when the credential is verified and/or the secure session to the service is successfully established.

In one or more embodiments, the management terminal 70 terminates S17 the secure session between the management terminal 70 and the service 800. The management terminal 70 establishes the secure session to obtain information about the server related to resumption and security context to support the resumption of the secure session at the resource-constrained device. The management terminal 70 thus establishes the secure session, obtains the necessary security context, and terminates the secure session.

According to some aspects of this disclosure, the management terminal 70 sends S18 the whitelist of approved services to the resource-constrained device 60. For example, the management terminal 70 distributes the whitelist to its resource-constrained devices, e.g. at some interval. The management terminal 70 alternatively or additionally maintains a lookup table that can be used by the resource-constrained devices when they need to connect to a service using certificates. This reduces the operations needed to be performed by the management terminal 70. The next time the resource-constrained device 60 initiates a connection to the same service 800, the resource-constrained device 60 is able to skip connecting to the management terminal 70, and is able to directly resume the secure session to the service using the security context, e.g. using TLS session identifier/ticket. Furthermore, any other resource-constrained device managed by the management terminal 70 using the whitelist is able to determine upon first connection to the service whether the service is approved, and supports session resumption. The other resource-constrained device can then request the management terminal 70 to initiate a secure session with the service and to transfer the security context of the secure session for resumption.

Figure 5:
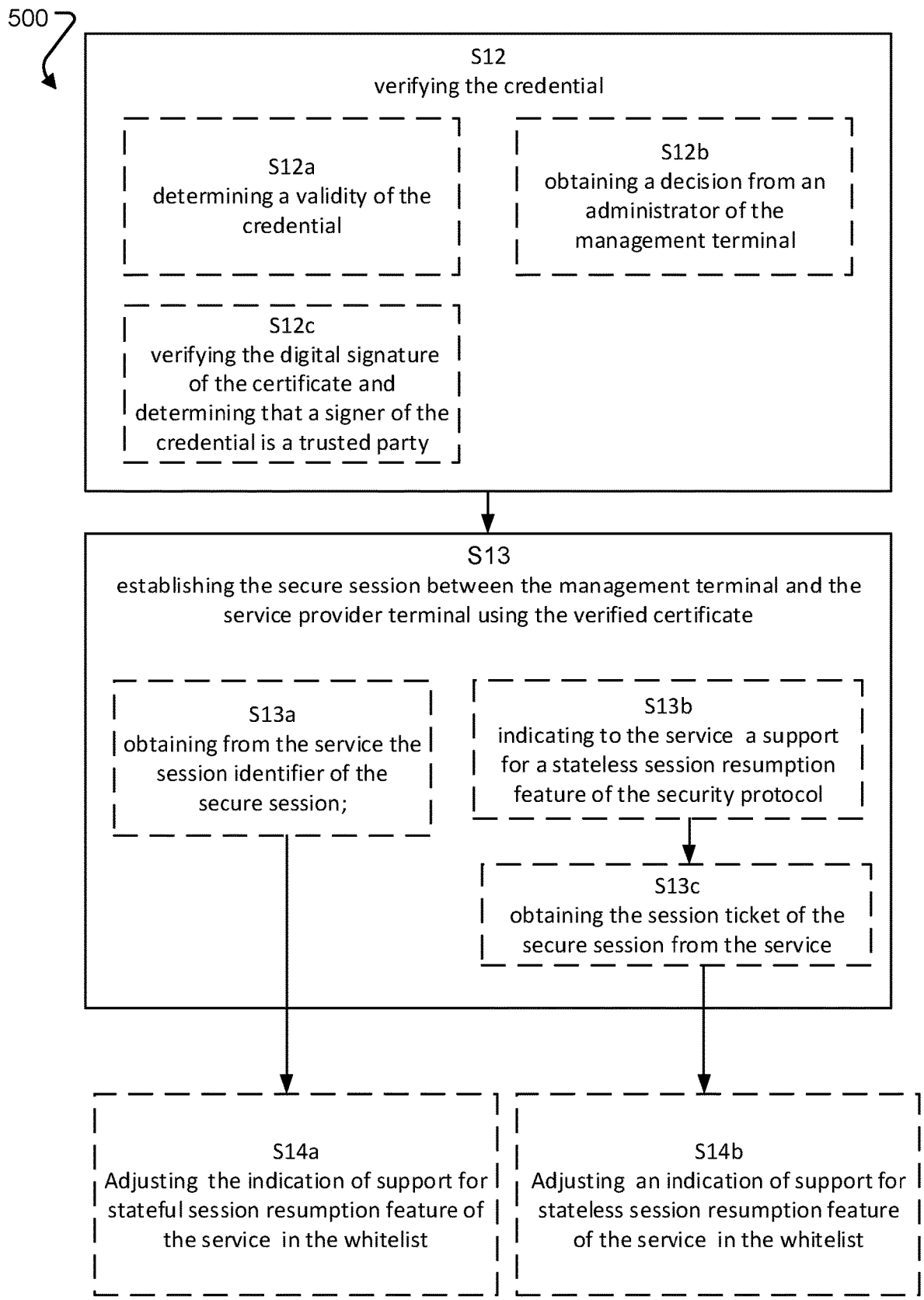
FIG. 5 is a flow chart illustrating an exemplary method, performed in a management terminal, for supporting an establishment of a secure session between a resource-constrained device and a service, according to this disclosure.

FIG. 5 shows a flow chart illustrating an exemplary method 500, performed in a management terminal 70, for supporting an establishment of a secure session between a resource-constrained device 60 and a service 800, according to this disclosure. Method 500 illustrates embodiments of the method performed in the management terminal 70 wherein verifying S12 the credential comprises determining S12a a validity of the credential; and/or obtaining S12b a decision from an administrator of the management terminal 70. When the credential comprises a digital signature, verifying S12 the credential comprises verifying S12c the digital signature and determining that a signer of the credential is a trusted party. For example, with a certificate, the verification involves, determining the validity of the certificate, verifying the digital signature comprised in the certificate, and/or determining that a signer of the credential is a trusted party. Verifying S12 the credential comprises e.g. determining whether the credential is comprised in the whitelist of approved services, and when it is determined that the credential is in the whitelist, then the credential is successfully verified.

Method 500 illustrates embodiments of the method performed in the management terminal 70 wherein the step of establishing S13 the secure session comprises obtaining S13a, from the service 800, the session identifier of the secure session. The management terminal 70 obtains e.g. the session identifier of the secure session established with the service 800, e.g. with the server terminal 80. For example, the management terminal 70 obtains the session identifier of the secure session established using TLS with the server terminal 80 supporting stateful session resumption. Optionally, the management terminal 70 then adjusts in step S14a an indication of support for stateful session resumption feature of the service 800 in the whitelist of approved services. The management terminal 70 may also store the adjusted whitelist.

Method 500 illustrates embodiments of the method performed in the management terminal 70 wherein the step of establishing S13 the secure session comprises indicating S13b to the service 800 a support for stateless session resumption feature of the security protocol and obtaining S13c the session ticket of the secure session from the service 800. The management terminal 70 indicates to the server terminal 80 that the management terminal 70 supports stateless session resumption and obtains the session ticket of the secure session from the server terminal 89 when the server terminal 80 supports stateless session resumption. For example, the management terminal 70 used the session ticket extension of TLS with the server terminal 80 supporting stateless session resumption. Optionally, the management terminal 70 adjusts in step S14b an indication of support for stateless session resumption feature of the service 800 in the whitelist of approved services. The management terminal 70 may also store the adjusted whitelist.

Figure 6A:
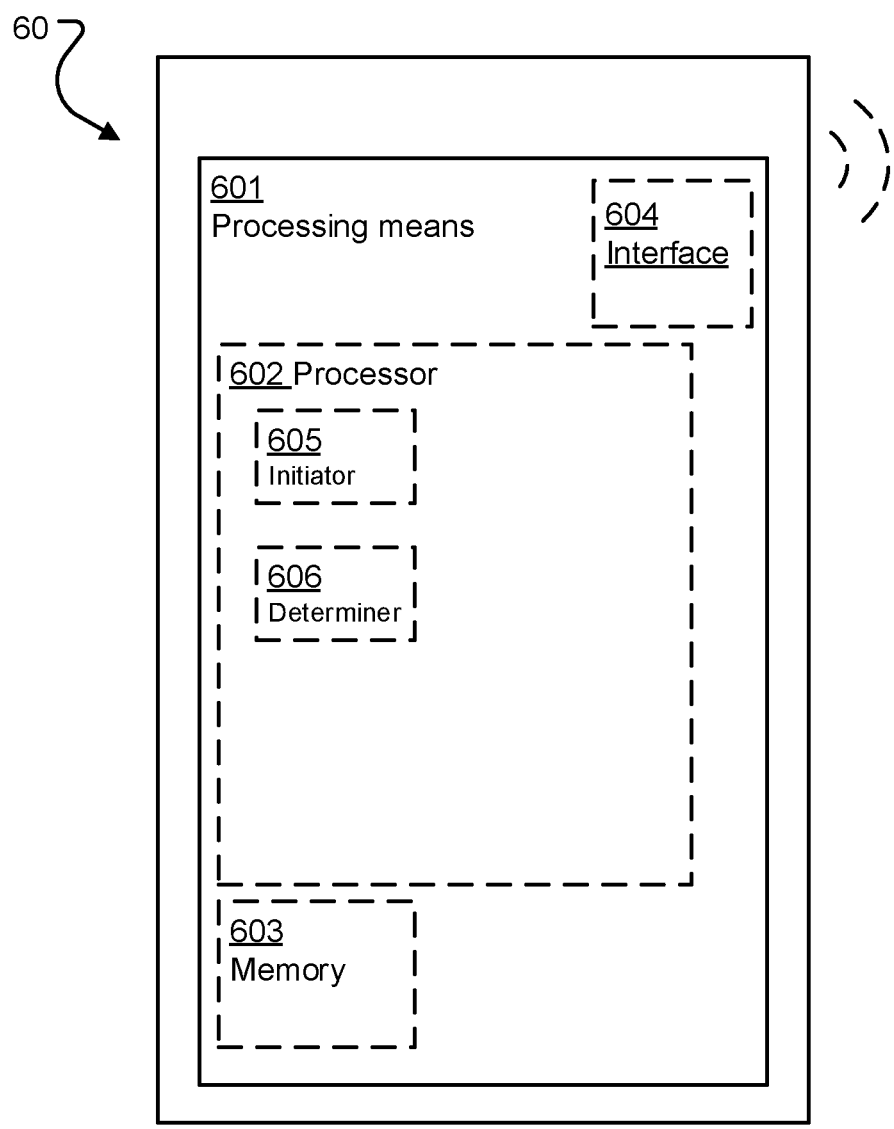
FIG. 6a is a block diagram illustrating an exemplary resource-constrained device, for establishing a secure session according to this disclosure.

FIG. 6a shows a block diagram illustrating an exemplary resource-constrained device 60, for establishing a secure session according to this disclosure. The resource-constrained device 60 comprises processing means 601 (such as processing circuitry) adapted to receive, from the server terminal 80, a credential associated with the service 800, and to send to the management terminal 70 a service approval request 803, the service approval request 803 comprising an identifier of the service 800 and/or the credential. Hence the processing means comprises an interface 604 configured to receive, from the server terminal 80, a credential associated with the service 800 and configured to send to the management terminal 70 a service approval request 803. The service approval request 803 comprises an identifier of the service 800 and/or the credential. The processing means 601 is adapted to receive from the management terminal 70 a response 805. The response 805 comprises an indication that the service 800 is approved, and a security context for a resumption of the secure session that has been established by the management terminal 70. Hence the interface 604 is configured to receive from the management terminal 70 a response 805. The interface 604 is configured for wired communications and/or wireless communications. The processing means 601 is adapted to initiate the resumption of the secure session with the service 800 using the security context. The processing means 601 comprises thus an initiator 605 configured to initiate the resumption of the secure session with the service.

In one or more embodiments, the processing means 601 comprises a processor 602 and a memory 603. The memory 603 contains instructions executable by the processor 602. Thereby the resource-constrained device 60 is operative to perform any of the steps of method 200. The resource-constrained device 60 is configured to receive, from the server terminal 80, a credential associated with the service 800, to send to the management terminal 70 a service approval request 803, and to receive from the management terminal 70 a response 805. Hence resource-constrained device 60 comprises an interface 604. The processor 602 is connected to the interface 604. The processor 602 is configured to initiate the resumption of the secure session with the service 800 using the security context. Hence the processor 602 comprises an initiator 605.

According to some aspects of this disclosure, the processing means 601 is adapted to determine whether the identifier of the service 800 is comprised in a whitelist of approved services. Hence, the processing means 601 comprises a determiner 606 configured to determine whether the identifier of the service 800 is comprised in a whitelist of approved services.

In one or more embodiments, the processor 602 is configured to determine whether the identifier of the service 800 is comprised in a whitelist of approved services, and thus comprises a determiner 606.

Figure 6B:
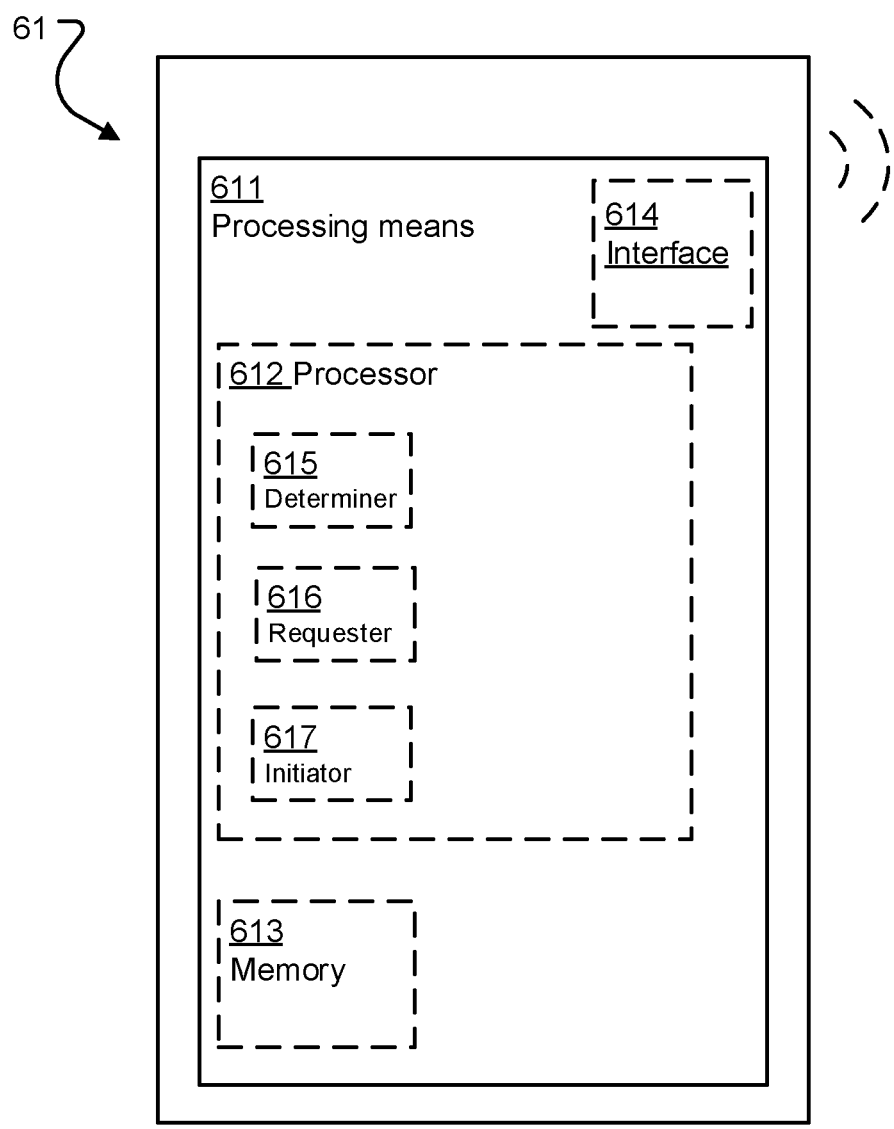
FIG. 6b is a block diagram illustrating another exemplary resource-constrained device, for establishing a secure session according to this disclosure.

FIG. 6b shows a block diagram illustrating another exemplary resource-constrained device 61, for establishing a secure session according to this disclosure. The resource-constrained device 61 for establishing a secure session with a service 800 delivered by a server terminal 80 using a security protocol over a communication network is registered with a management terminal 70. The resource-constrained device 61 comprises processing means 611 adapted to obtain a whitelist of approved services. Hence the processing means 611 comprises an interface 614 configured to obtain a whitelist of approved services, such as to receive the whitelist from the management terminal 70 and/or to retrieve the whitelist from a network location indicated by the management terminal 70. The processing means 611 is adapted to determine whether an identifier of the service 800 is comprised in the whitelist of approved services. Hence the processing means 611 comprises a determiner 615. When it is determined that the identifier of the service 800 is comprised in the whitelist, the processing means 611 is adapted to determine based on the whitelist whether the service 800 supports session resumption. Hence the determiner 615 is configured to determine based on the whitelist whether the service 800 supports session resumption. When it is determined that the service 800 supports session resumption, the processing means 611 is adapted to request a security context of the secure session from the management terminal 70. Hence the processing means 611 comprises a requester 616 for requesting a security context of the secure session from the management terminal 70, possibly via the interface 614. The processing means 611 is adapted to receive, from the management terminal 70, the security context of the secure session. Hence, the interface 614 is configured to receive from the management terminal 70, the security context of the secure session. The processing means 611 is adapted to initiate a resumption of the secure session with the service 800 using the security context. Hence, the processing means 611 comprises an initiator 617 configured to initiate a resumption of the secure session with the service 800 using the security context.

In one or more embodiments, the processing means 611 comprises a processor 612 and a memory 613. The memory 613 contains instructions executable by the processor 612. Thereby the resource-constrained device 61 is operative to perform any of the steps of method 300. The resource-constrained device 61 is configured to obtain a whitelist of approved services. Hence resource-constrained device 61 comprises an interface 614. The processor 612 is connected to the interface 614. The processor 612 is configured to determine whether an identifier of the service 800 is comprised in the whitelist of approved services. Hence the processor 612 comprises a determiner 615. The processor 612 is adapted to determine whether an identifier of the service 800 is comprised in the whitelist of approved services. Hence the processor 612 comprises a determiner 615. When it is determined that the identifier of the service 800 is comprised in the whitelist, the processor 612 is adapted to determine based on the whitelist whether the service 800 supports session resumption. Hence the determiner 615 is configured to determine based on the whitelist whether the service 800 supports session resumption. When it is determined that the service 800 supports session resumption, the processor 612 is adapted to request a security context of the secure session from the management terminal 70. Hence the processor 612 comprises a requester 616 for requesting a security context of the secure session from the management terminal 70, possibly via the interface 614. The processor 612 is adapted to receive, from the management terminal 70, the security context of the secure session. Hence, the interface 614 is configured to receive from the management terminal 70, the security context of the secure session. The processor 612 is configured to initiate the resumption of the secure session with the service 800 using the security context. Hence the processor 612 comprises an initiator 617.

Figure 7:
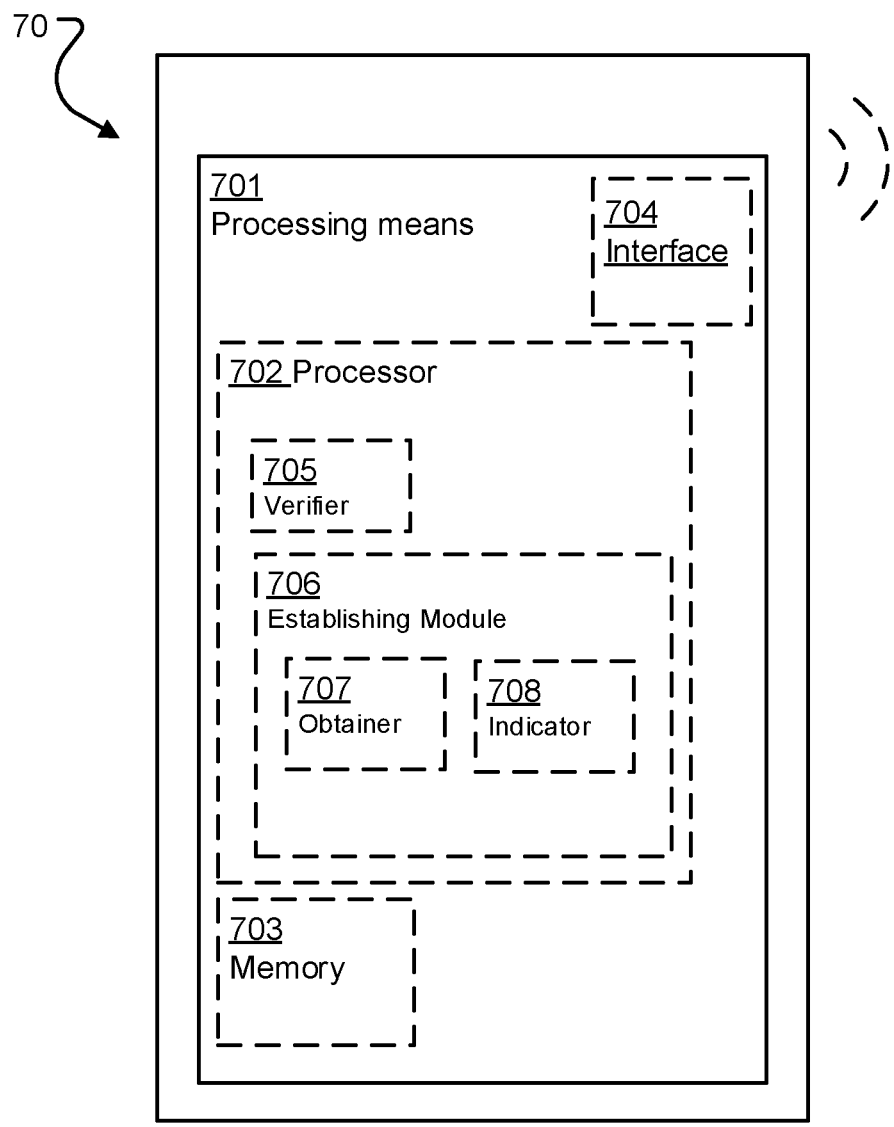
FIG. 7 is a block diagram illustrating an exemplary a management terminal, for supporting an establishment of a secure session according to this disclosure.

FIG. 7 shows a block diagram illustrating an exemplary a management terminal 70, for supporting an establishment of a secure session, according to this disclosure. The management terminal 70 supports an establishment of a secure session between a resource-constrained device 60 and a service 800. The management terminal 70 comprises processing means 701 adapted to receive a service approval request 803 from the resource-constrained device 60. Hence the processing means 701 comprises an interface 704 configured to receive a service approval request 803 from the resource-constrained device 60. The service approval request 803 comprises an identifier of the service 800 and/or a credential associated with the service 800. The processing means 701 is adapted to verify the credential in order to approve the service 800. Hence the processing means 701 comprises a verifier 705 configured to verify the credential in order to approve the service 800. The processing means 701 is adapted to establish a secure session between the management terminal 70 and the service 800 using the verified credential. Hence the processing means 701 comprises an establishing module 706 configured to establish a secure session between the management terminal 70 and the service 800 using the verified credential. The processing means 701 is adapted to store a security context of the secure session. Hence the processing means 701 comprises a memory 703 to store a security context of the secure session. The processing means 701 is adapted to send to the resource-constrained device 60 a response 805. The response 805 comprises an indication that the service 800 is approved, and the security context for enabling a resumption of the secure session between the resource-constrained device 60 and the service 800. Hence the interface 704 is configured to send to the resource-constrained device 60, a response 805.

In one or more embodiments, the processing means 701 comprises a processor 702 and a memory 703 wherein the memory 703 contains instructions executable by the processor 702. Thereby the management terminal 70 is operative to perform any of the steps of methods 400 and/or 500. The management terminal 70 is adapted to receive a service approval request 803 from the resource-constrained device 60. Hence the management terminal 70 comprises an interface 704 configured to receive a service approval request 803 from the resource-constrained device 60. The processor 702 is connected to the interface 704. The processor 702 is adapted to verify the credential in order to approve the service 800. Hence the processor 702 comprises a verifier 705 configured to verify the credential in order to approve the service 800. The processor 702 is adapted to establish a secure session between the management terminal 70 and the service 800 using the verified credential. Hence the processor 702 comprises an establishing module 706 configured to establish a secure session between the management terminal 70 and the service 800 using the verified credential. The processor 702 is adapted to store a security context of the secure session. Hence the processor 702 comprises a memory 703 to store a security context of the secure session. The processor 702 is adapted to send to the resource-constrained device 60 a response 805. The response 805 comprises an indication that the service 800 is approved, and the security context for enabling a resumption of the secure session between the resource-constrained device 60 and the service 800. Hence the interface 704 is configured to send to the resource-constrained device 60, a response 805.

According to some aspect of this disclosure, the processing means 701 adapted to establish the secure session is adapted to obtain from the service 800 a session identifier of the secure session. Thus, the processing means 701 or the establishing module 706 comprises e.g. an obtainer 707 configured to obtain from the service 800 a session identifier of the secure session.

According to some aspect of this disclosure, the processing means 701 adapted to establish the secure session is adapted to indicate to the service 800 a support for stateless session resumption feature of the security protocol; and to obtain the session ticket of the secure session from the service 800. Thus, the processing means 701 or the establishing module 706 comprises e.g. an indicator 708 configured to indicate to the service 800 a support of the management terminal 70 for stateless session resumption feature of the security protocol and the obtainer 707 configured to obtain from the service 800 the session ticket of the secure session.

The processor 602, 612, 702 may be constituted by any suitable Central Processing Unit, CPU, microcontroller, Digital Signal Processor, DSP, etc. capable of executing computer program code. The memory 603, 613, 703 may be any suitable type of computer readable memory and may be of volatile and/or non-volatile type.

FIG. 8 shows a signaling diagram illustrating an exemplary exchange of messages for establishing a secure session according to this disclosure. The signaling diagram shows a resource-constrained device 60, a management terminal 70, and a service 800. The service 800 is delivered by the server terminal 80. The resource-constrained device 60 initiates, e.g. for the first time, a communication with service 800, e.g. with server terminal 80, by sending a message 801. The service 800, such as the server terminal 80, replies with a message 802 including a credential associated with the service or a pointer to the credential. Message 802 also includes e.g. an indication that the service 800 intends to use a public-key based protocol (e.g. TLS, SSH, SSL, DTLS). The resource-constrained device 60 sends to the management terminal 70 a service approval request 803 to obtain approval of the service based on the credential. The management terminal 70 receiving the credential verifies the credential and then establishes 804 using the verified credential a secure session with the service 800, such as with the server terminal 80 supporting resumption. For example, the management terminal 70 establishes a TLS secure session using a TLS handshake procedure. The establishment 804 of the secure session involves an exchange of messages (not shown in FIG. 8) between the service 800 and the management terminal 70. Upon successful session establishment, the management terminal 70 returns a response 805 to the resource-constrained device 60. The response 805 comprises an indication that the service is approved and a security context for resumption of the secure session. The resource-constrained device 60 is then able to initiate an establishment of the secure session with the service by resuming the secure session established by the management terminal 70.

Figure 9:
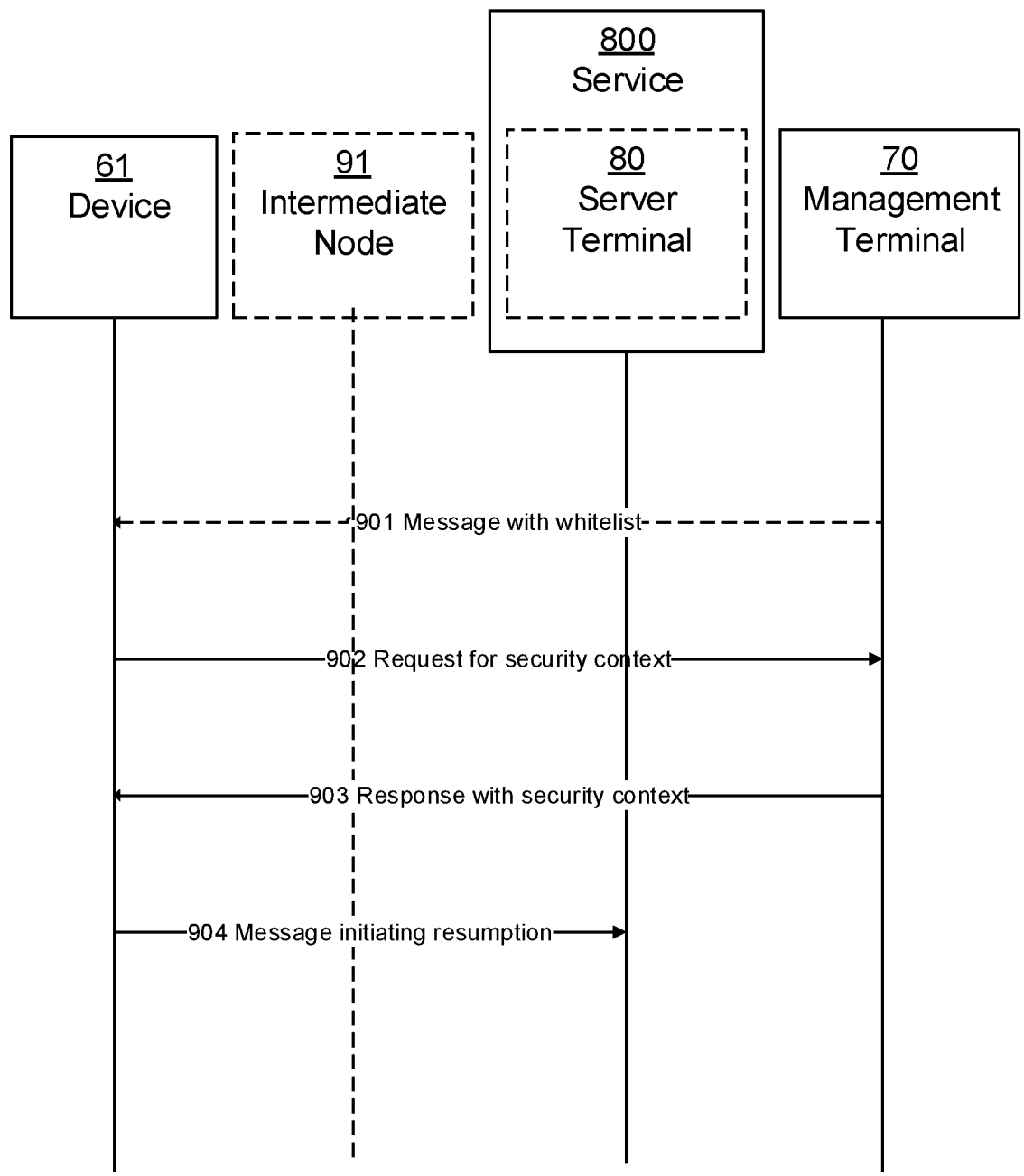
FIG. 9 is a signaling diagram illustrating another exemplary exchange of messages for establishing a secure session according to this disclosure.

FIG. 9 shows a signaling diagram illustrating another exemplary exchange of messages for establishing a secure session according to this disclosure. The signaling diagram shows a resource-constrained device 61, a management terminal 70, and a service 800. The service 800 is delivered by the server terminal 80. The resource-constrained device 61 receives from the management terminal 70 a whitelist of approved services in message 901. The resource-constrained device 61 intends to access the service 800 identified by an identifier (e.g. a URL). Prior to accessing the service 800, the resource-constrained device 61 determines, whether the identifier of the service is comprised in the whitelist, i.e. whether the service is approved. When it is determined that the identifier is comprised in the whitelist, i.e. the service is approved, the resource-constrained device 61 sends to the management terminal 70 a request 902 to obtain security context. The request 902 comprises e.g. the identifier of the service and/or the credential of the service. The management terminal replies with a response 903 including the security context for resumption of the secure session at the resource-constrained device 61. The resource-constrained device 61 then initiates the resumption of the secure session with the service 800, such as with the server terminal 80, using the security context. For example, the resource-constrained device 61 initiates an abbreviated TLS handshake using the session identifier or session ticket comprised in the security context.

It should be appreciated that FIGS. 1-9 comprises some operations or modules which are illustrated with a darker border and some operations or modules which are illustrated with a dashed border. The operations or modules which are comprised in a darker border are operations or modules which are comprised in the broadest example embodiment. The operations or modules which are comprised in a dashed border are example embodiments which may be comprised in, or a part of, or are further operations which may be taken in addition to the operations or modules of the border example embodiments. It should be appreciated that these operations or modules need not be performed in order. Furthermore, it should be appreciated that not all of the operations need to be performed or modules need to be present. The example operations may be performed in any order and in any combination.

It should be appreciated that the example operations of FIG. 1 through 5 may be performed simultaneously for any number of terminals in the communication network.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

According to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a resource-constrained device, for communicating with a service delivered by a server terminal using a security protocol over a communication network, wherein the resource-constrained device is registered at a management terminal, the method comprising:
   receiving, by the resource constrained device from the server terminal, a credential associated with the service;
   sending, by the resource constrained device to the management terminal, a service approval request, the service approval request comprising one or more of: an identifier of the service and the credential;
   receiving, by the resource constrained device from the management terminal, a response, the response comprising an indication that the service is approved and a security context associated with a first secure session that was previously established between the management terminal and the service, wherein the security context comprises at least one of: i) a session identifier identifying the first secure session that was previously established between the management terminal and the service or ii) session information that enables the service to rebuild state information corresponding to the first secure session; and
   in response to receiving from the management terminal the response comprising the indication and the security context, initiating, by the resource-constrained device, an abbreviated procedure for establishing a second secure session between the resource-constrained device and the service, wherein the initiating the abbreviated procedure for establishing the second secure session comprises transmitting, by the resource-constrained device, to the service at least: i) the session identifier identifying the first secure session that was previously established between the management terminal and the service or ii) the session information that enables the service to rebuild the state information corresponding to the first secure session.

2. The method of claim 1, the method comprising determining whether the identifier of the service is comprised in a list of approved services; and sending to the management terminal the service approval request when it is determined that the identifier of the service is not comprised in the list.

3. The method of claim 1, wherein the step of receiving the credential comprises: receiving a locator directing to the credential and obtaining the credential based on the locator.

4. The method of claim 1, wherein the security protocol comprises a public key-based security protocol and wherein the public key-based security protocol comprises a transport layer security (TLS) protocol, a secure sockets layer (SSL) protocol, a datagram transport layer security (DTLS) protocol, and/or a secure shell (SSH) protocol.

5. The method of claim 1, further comprising:
   prior to receiving the credential from the server terminal, the resource-constrained device transmitting to the server terminal a message for initiating a communication session with the service, wherein the server terminal responds to the message by transmitting a response message comprising the credential; and
   the resource-constrained device determining whether the response message indicates that the service intends to use a certificate based protocol to communicate with the resource constrained device, wherein the resource-constrained device sends to the management terminal the service approval request as a result of determining that the service intends to use the certificate based protocol.

6. The method of claim 1, wherein
   the security context comprises the session identifier, and
   the step of initiating the abbreviated procedure for establishing the second secure session comprises the resource-constrained device transmitting to the server terminal a message for initiating a handshake with the server terminal, wherein the message for initiating the handshake comprises the session identifier identifying the first secure session that was established between the management terminal and the service.

7. The method of claim 1, wherein the step of initiating the abbreviated procedure for establishing the second secure session comprises initiating an abbreviated handshake of the Transport Layer Security (TLS) protocol.

8. A method, performed in a resource-constrained device, for communicating with a service delivered by a server terminal using a security protocol over a communication network, wherein the resource-constrained device is registered at a management terminal, the method comprising:
obtaining a list of approved services;
determining whether an identifier of the service is comprised in the obtained list of approved services;
as a result of determining that the identifier of the service is comprised in the obtained list of approved services, determining whether the service supports session resumption;
as a result of determining that that the service supports session resumption, requesting from the management terminal a security context of a first secure session that was previously established between the management terminal and the service;
receiving, from the management terminal, the security context of the first secure session that was previously established between the management terminal and the service, wherein the security context comprises at least one of: i) a session identifier identifying the first secure session that was previously established between the management terminal and the service or ii) session information that enables the service to rebuild state information corresponding to the first secure session; and
in response to receiving from the management terminal the security context of the first secure session, initiating, by the resource-constrained device, an abbreviated procedure for establishing a second secure session between the resource-constrained device and the service, wherein initiating the abbreviated procedure for establishing the second secure session comprises transmitting, by the resource-constrained device, to the service at least: i) the session identifier identifying the first secure session that was previously established between the management terminal and the service or ii) the session information that enables the service to rebuild the state information corresponding to the first secure session.

9. The method of claim 8, wherein the step of determining whether the service supports session resumption comprises determining whether the list comprises information indicating the service supports session resumption.

10. A method, performed in a management terminal, the method comprising:
receiving, from a resource-constrained device, a service approval request, the service approval request comprising a credential associated with the service;
verifying the credential in order to approve the service;
establishing, by the management terminal, a first secure session with the service using the verified credential;
storing a security context of the first secure session established between the management terminal and the service, wherein the security context is for enabling the resource-constrained device to establish a second secure session with the service using an abbreviated session establishment procedure; and
in response to the receiving from the resource-constrained device the service approval request, sending, by the management terminal, to the resource-constrained device a response to the service approval request, the response comprising i) an indication that the service is approved and ii) the security context for enabling the resource-constrained device to establish the second secure session with the service using the abbreviated session establishment procedure, wherein the security context comprises at least one of: i) a session identifier identifying the first secure session established between the management terminal and the service or ii) session information that enables the service to rebuild state information corresponding to the first secure session established between the management terminal and the service.

11. The method of claim 10, wherein the security context of the first secure session comprises the session identifier of the first secure session.

12. The method of claim 10, wherein the service approval request further comprises an identifier of a service and the method further comprises adding the identifier of the service in a list of approved services.

13. The method of claim 10, wherein the step of verifying the credential comprises determining a validity of the credential; and/or obtaining a decision from an administrator of the management terminal.

14. The method of claim 10, wherein the credential comprises a digital signature, and wherein the step of verifying the credential comprises verifying the digital signature and determining that a signer of the credential is a trusted party.

15. The method of claim 10, the method further comprising terminating the first secure session between the management terminal and the service.

16. The method of claim 10, wherein the step of establishing the first secure session comprises obtaining, from the service, the session identifier of the first secure session.

17. The method of claim 16, the method further comprising adjusting an indication of support for stateful session resumption feature of the service in a list of approved services.

18. The method of claim 10, wherein the step of establishing the first secure session comprises:
indicating to the service a support for stateless session resumption; and
obtaining a session ticket of the first secure session from the service.

19. The method of claim 18, the method further comprising adjusting an indication of support for stateless session resumption in a list of approved services.

20. The method of claim 10, the method further comprising sending a list of approved services to the resource-constrained device.

21. The method of claim 20, wherein the list of approved services comprises for each service: an identifier of the service, an approval status of the service, the credential associated with the service, an indication of support for the stateful session resumption feature of the service, and/or an indication of support for the stateless session resumption feature of the service.

22. The method of claim 10, wherein the service approval request further comprises an identifier of a service and the identifier of the service comprises a uniform resource identifier of the service.

23. The method of claim 10, wherein the credential comprises a certificate associated with the service, a fingerprint of the certificate and/or a public key associated with the service.

24. The method of claim 10, wherein establishing the first secure session with the service comprises performing a full handshake of the Transport Layer Security (TLS) protocol with the service.

25. A resource-constrained device for communicating with a service delivered by a server terminal using a security protocol over a communication network, wherein the resource-constrained device is registered with a management terminal, the resource-constrained device comprising processing means adapted to:
  receive, from the server terminal, a credential associated with the service;
  send to the management terminal a service approval request, the service approval request comprising an identifier of the service and the credential;
  receive a response from the management terminal, the response comprising i) an indication that the service is approved and ii) a security context associated with a first secure session that was previously established between the management terminal and the service, wherein the security context comprises at least one of: i) a session identifier identifying the first secure session that was previously established between the management terminal and the service or ii) session information that enables the service to rebuild state information corresponding to the first secure session; and
  initiate in response to receiving from the management terminal the response comprising the indication and the security context, an abbreviated procedure for establishing a second secure session between the resource-constrained device and the service, wherein initiating the abbreviated procedure for establishing the second secure session comprises transmitting to the service at least: i) the session identifier identifying the first secure session that was previously established between the management terminal and the service or ii) the session information that enables the service to rebuild the state information corresponding to the first secure session.

26. The device of claim 25, wherein the processing means comprises a processor and a memory wherein the memory contains instructions executable by the processor.

27. The device of claim 25, wherein the processing means is adapted to determine whether the identifier of the service is comprised in a list of approved services.

28. A resource-constrained device for communicating with a service delivered by a server terminal using a security protocol over a communication network, wherein the resource-constrained device is registered with a management terminal, the resource-constrained device comprising processing means adapted to:
  obtain a list of approved services;
  determine whether an identifier of the service is comprised in the obtained list of approved services;
  as a result of determining that the identifier of the service is comprised in the list, determine whether the service supports session resumption;
  as a result of determining that that the service supports session resumption, request from the management terminal a security context of a first secure session that was previously established between the management terminal and the service;
  receive, from the management terminal, the security context of the first secure session that was previously established between the management terminal and the service, wherein the security context comprises at least one of: i) a session identifier identifying the first secure session that was previously established between the management terminal and the service or ii) session information that enables the service to rebuild state information corresponding to the first secure session; and
  initiate, in response to receiving from the management terminal the security context of the first secure session, an abbreviated procedure for establishing a second secure session between the resource-constrained device and the service, wherein initiating the abbreviated procedure for establishing the second secure session comprises transmitting to the service at least: i) the session identifier identifying the first secure session that was previously established between the management terminal and the service or ii) the session information that enables the service to rebuild the state information corresponding to the first secure session.

29. A management terminal for supporting an establishment of a secure session between a resource-constrained device and a service, the resource-constrained device being registered at the management terminal, the management terminal comprising processing means adapted to:
  receive a service approval request from the resource-constrained device, the service approval request comprising a credential associated with the service;
  verify the credential in order to approve the service;
  establish a first secure session between the management terminal and the service using the verified credential;
  store a security context of the first secure session established between the management terminal and the service; and
  in response to receiving the service approval request from the resource-constrained device, send to the resource-constrained device a response to the service approval request, the response comprising i) an indication that the service is approved, and ii) the security context for enabling the resource-constrained device to establish a second secure session with the service using an abbreviated session establishment procedure, wherein the security context comprises at least one of: i) a session identifier identifying the first secure session established between the management terminal and the service or ii) session information that enables the service to rebuild state information corresponding to the first secure session established between the management terminal and the service.

30. The management terminal of claim 29, wherein the processing means comprises a processor and a memory wherein the memory contains instructions executable by the processor.

31. The management terminal of claim 29, wherein the processing means adapted to establish the first secure session is adapted to obtain from the service the session identifier of the first secure session.

32. The management terminal of claim 29, wherein the processing means adapted to establish the first secure session is adapted to indicate to the service a support for stateless session resumption; and to obtain a session ticket of the first secure session from the service.

* * * * *